US005175262A

United States Patent [19]

Loeffler et al.

[11] Patent Number: 5,175,262

[45] Date of Patent: Dec. 29, 1992

[54] DOUBLED REACTIVE DYES

[75] Inventors: Hermann Loeffler, Speyer; Klaus Pandl, Ludwigshafen; Manfred Patsch, Wachenheim; Siegel Bernd, Ludwigshafen, all of Fed. Rep. of Germany

[73] Assignee: BASF Aktiengesellschaft, Ludwigshafen, Fed. Rep. of Germany

[21] Appl. No.: 781,643

[22] Filed: Oct. 25, 1991

Related U.S. Application Data

[63] Continuation of Ser. No. 489,982, Feb. 20, 1990, abandoned.

[30] Foreign Application Priority Data

Mar. 13, 1989 [DE] Fed. Rep. of Germany ....... 3908073

[51] Int. Cl.[5] .................... C09B 62/513; C09B 62/09; D06P 1/38

[52] U.S. Cl. .................................... 534/634; 534/617; 544/209

[58] Field of Search ............................... 534/617, 634

[56] References Cited

U.S. PATENT DOCUMENTS

| | | | |
|---|---|---|---|
| 3,647,778 | 3/1972 | Andrew et al. | 534/634 |
| 4,323,497 | 4/1972 | Hoyer et al. | 534/634 X |
| 4,407,748 | 10/1983 | Gorbacheva et al. | 534/638 |
| 4,670,547 | 6/1987 | Lehr | 534/634 X |
| 4,845,202 | 7/1989 | Schlafer et al. | 534/605 |
| 5,059,681 | 10/1991 | Taylor | 534/634 |

FOREIGN PATENT DOCUMENTS

| | | | |
|---|---|---|---|
| 235521 | 9/1987 | European Pat. Off. | 534/634 |
| 3135432 | 3/1983 | Fed. Rep. of Germany | 534/634 |
| 3636398 | 5/1988 | Fed. Rep. of Germany . | |
| 52-40686 | 3/1977 | Japan | 534/634 |
| 53-40682 | 10/1978 | Japan . | |

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Reactive dyes of the formula

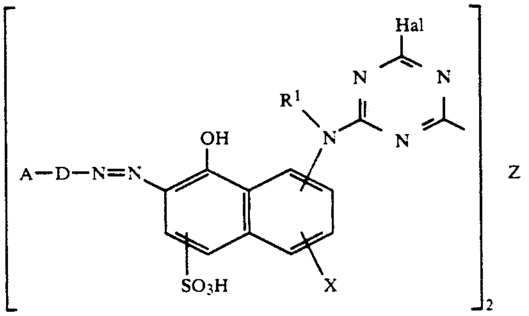

where
$R^1$ is hydrogen, methyl or ethyl,
X is hydrogen or hydroxysulfonyl,
Hal is fluorine or chlorine,
D is phenylene, carboxyl- or hydroxysulfonyl-monosubstituted or -disubstituted phenylene or hydroxysulfonyl-monosubstituted or -disubstituted naphthylene,
A is a fiber-reactive radical, or A—D combined is a benzo-fused fiber-reactive radical, and
Z is a bridge member, are useful for dyeing or printing hydroxyl- or nitrogen-containing substrates.

6 Claims, No Drawings

DOUBLED REACTIVE DYES

This application is a continuation of application Ser. No. 07/489,982, filed Feb. 20, 1990, now abandoned.

The present invention relates to novel reactive dyes of the formula I

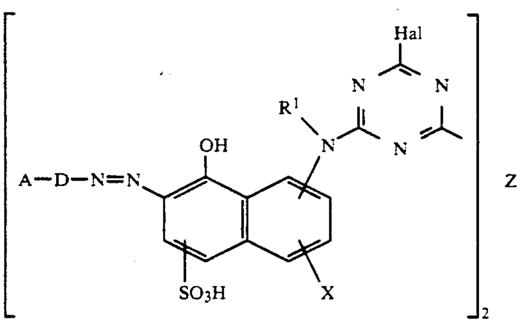

(I)

where $R^1$ is hydrogen, methyl or ethyl,

X is hydrogen or hydroxysulfonyl,

Hal is fluorine or chlorine,

D is phenylene, carboxyl- or hydroxysulfonyl-monosubstituted or -disubstituted phenylene or hydroxysulfonyl-monosubstituted or -disubstituted naphthylene, A is a fiber-reactive radical, or A—D combined is a benzo-fused fiber-reactive radical, and Z is a bridge member of the formula

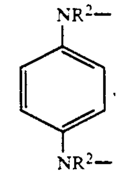
,
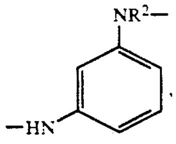
,
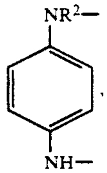
,
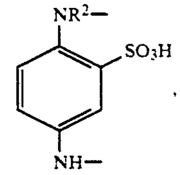
,
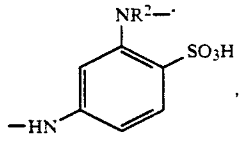
,
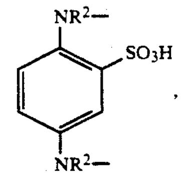
,
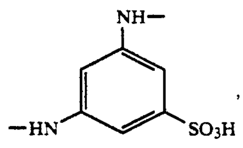
,
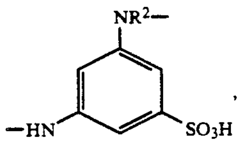
,
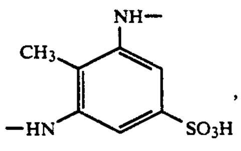
,
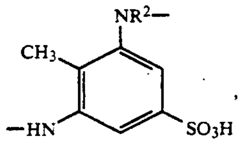
,
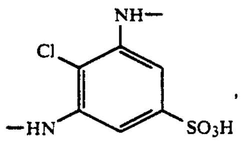
, -continued

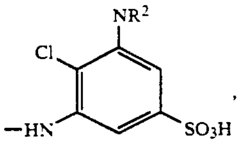
,
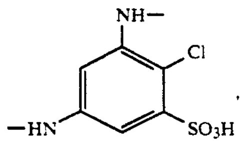
,
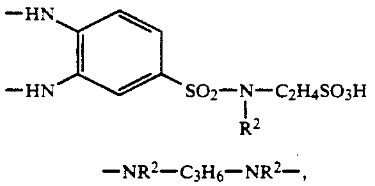
or $-NR^2-C_3H_6-NR^2-$, where $R^2$ is $C_1$-$C_4$-alkyl.

JP-A-27 628/1978 and DE-A-3 135 432 disclose reactive dyes which are similar to those of the formula I. However, they differ in the bridge member Z which joins the two chromophore radicals together It has been found that the prior art dyes still have application defects.

It is an object of the present invention to provide new reactive dyes having advantageous properties, in particular a high fixation efficiency.

We have found that this object is achieved by the reactive dyes of the formula I defined in more detail at the beginning.

$R^2$ in the formula I is for example methyl, ethyl, propyl, isopropyl, butyl, isobutyl or sec-butyl.

D is for example

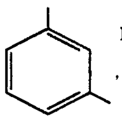
,
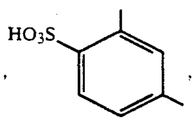
,
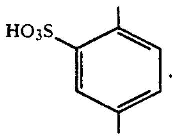
,
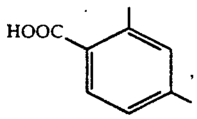
,
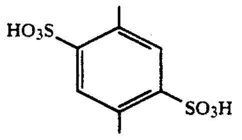
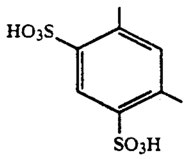
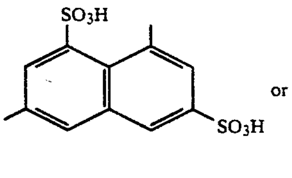
or
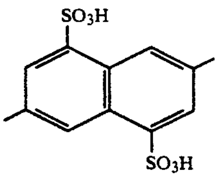

Fiber-reactive radicals A are those which react substitutively or additively with the hydroxyl- or nitrogen-containing groups of the substrates to be treated. The fact that the reactive radical A reacts substitutively with the relevant groups in the substrates, for example with the hydroxyl groups of cellulose, means that the leaving groups or atoms (for example fluorine or chlorine) are replaced in the fiber-reactive radical A by the hydroxyl groups of the cellulose in accordance with the following scheme:

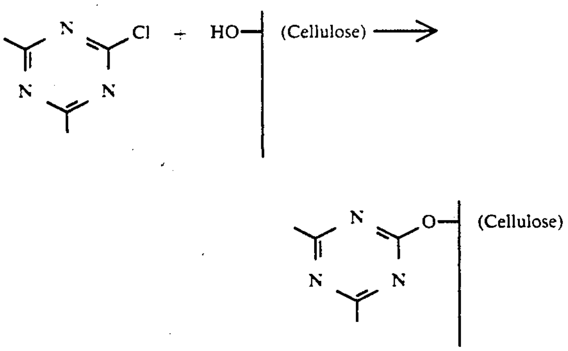

The fact that the fiber-reactive radical A reacts additively with the relevant groups in the substrates, for example with the hydroxyl groups of cellulose, means that the hydroxyl groups of the cellulose are added to the fiber-reactive radical in accordance with the following scheme:

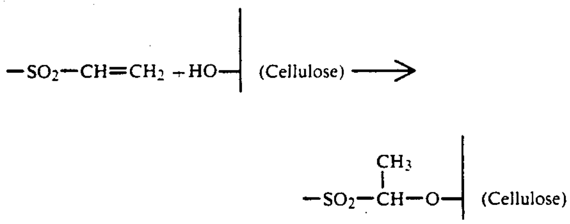

Fiber-reactive radicals A are for example vinylsulfonyl, 2-hydroxyethylsulfonyl radicals which are esterified with polybasic inorganic acids and form vinylsulfonyl under dyeing conditions, halogen-substituted radicals of 1,3,5-triazine, quinoxaline, phthalazine, pyrimidine or pyridazone, and the 2-alkylsulfonylbenzothiazole radical.

Examples are the following radicals: $—SO_2—C_2H_4OSO_3H$, $—SO_2—C_2H_4OPO_3H_2$,

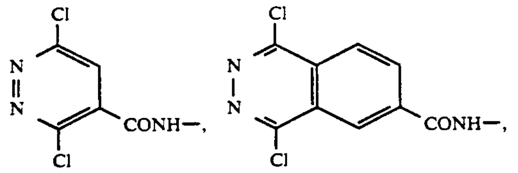

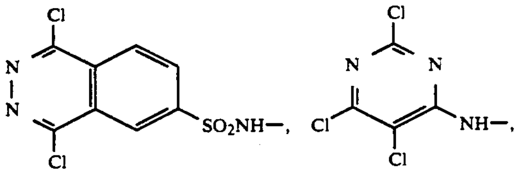

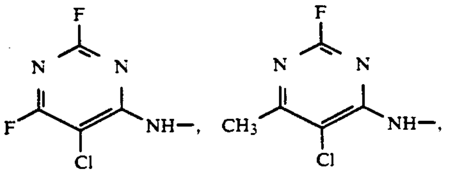

-continued

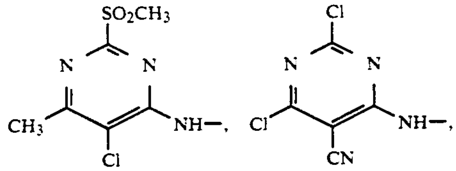

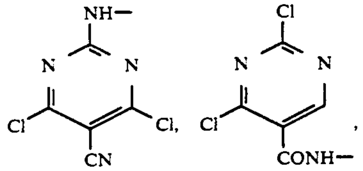

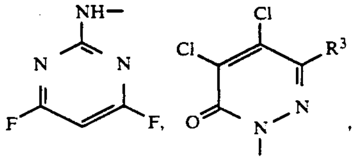

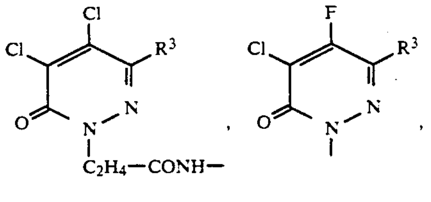

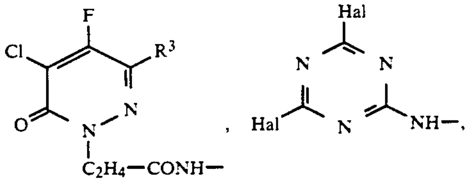

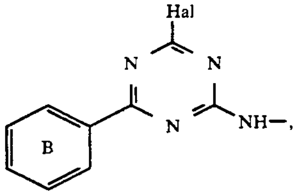

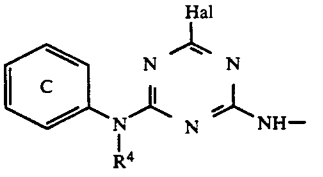

and

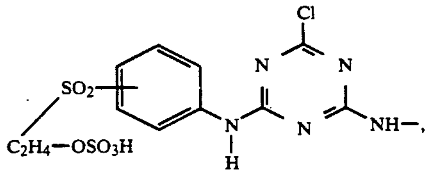

where Hal is fluorine or chlorine and $R^3$ is hydrogen or nitro and the rings B and C may each be substituted by hydroxysulfonyl and the ring C independently thereof by chlorine, nitro, by up to two methoxy groups or by up to three $C_1$–$C_4$-alkyl groups.

If the radical A—D is a benzo-fused reactive radical, a possibility is for example the 2-alkylsulfonylbenzothiazole radical. Examples are the radicals

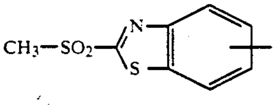
and

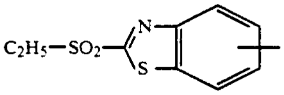

Radicals of the coupling components of the formula

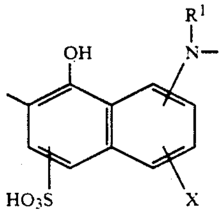

are for example

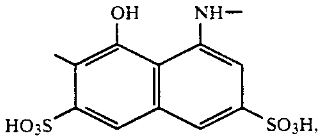

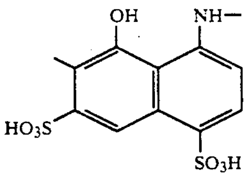

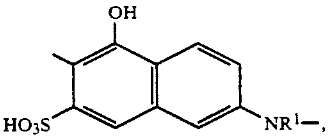

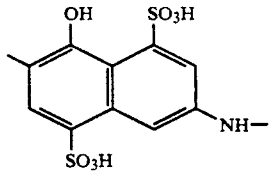
and

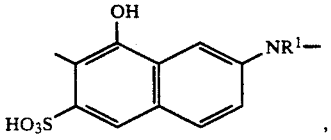
, where $R^1$ is hydrogen, methyl or ethyl.

Preference is given to reactive dyes of the formula I where A is a radical of the formula

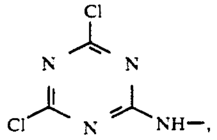

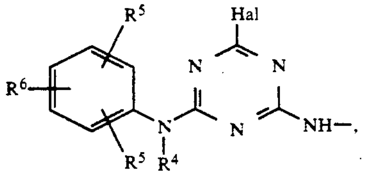

$-SO_2-C_2H_4OSO_3H$ or $-SO_2-CH{=}CH_2$ where Hal is as defined above, $R^4$ is hydrogen or $C_1$–$C_4$-alkyl, $R^5$ is hydrogen, $C_1$–$C_4$-alkyl or $C_1$–$C_4$-alkoxy and $R^6$ is hydrogen, $C_1$–$C_4$-alkyl or hydroxysulfonyl.

Preference is further given to reactive dyes of the formula I where D is the radical

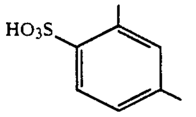
or
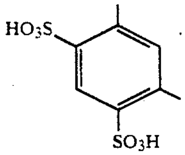

Preference is further given to reactive dyes of the formula I where the radical

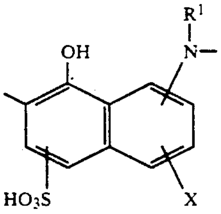
is

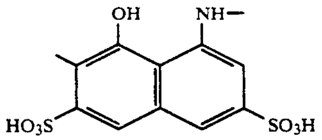

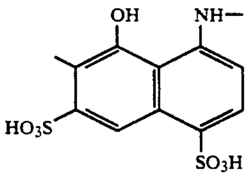
or

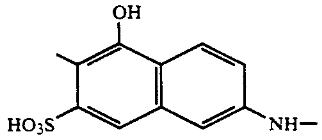

Preference is further given to reactive dyes of the formula I where the bridge member Z conforms to the formula $Z^1$ and is the radical

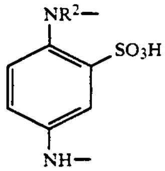

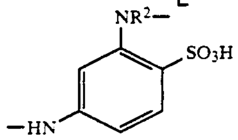

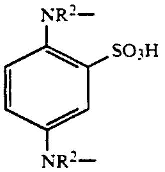

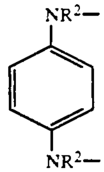

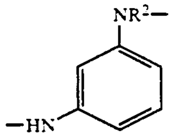

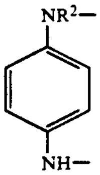

or

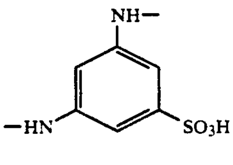

where $R^2$ is in each case as defined above.

Particular preference is given to reactive dyes of the formula Ia

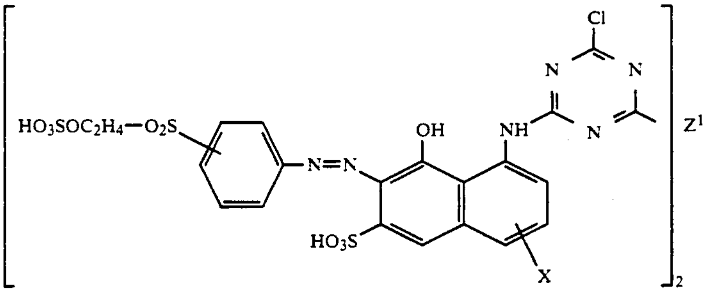

(Ia)

where

X is hydrogen or hydroxysulfonyl and $Z^1$ is as defined above.

Particular preference is further given to reactive dyes of the formula Ib

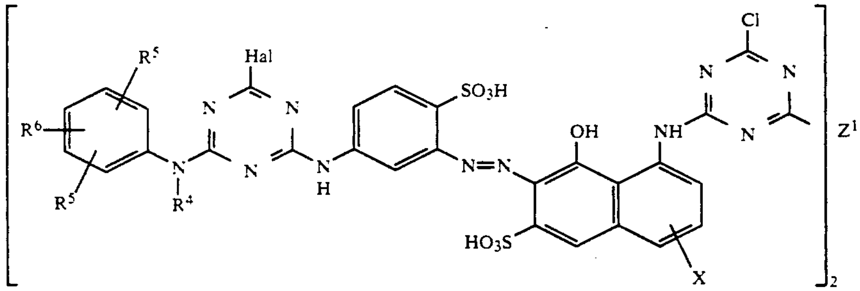

(Ib)

where

Hal is fluorine or chlorine, $R^4$ is hydrogen or $C_1$-$C_4$-alkyl, $R^5$ is hydrogen, $C_1$-$C_4$-alkyl or $C_1$-$C_4$-alkoxy, $R^6$ is hydrogen, $C_1$-$C_4$-alkyl or hydroxysulfonyl, X is hydrogen or hydroxysulfonyl, and $Z^1$ is as defined above.

Particular preference is further given to reactive dyes which conform to the formula Ic

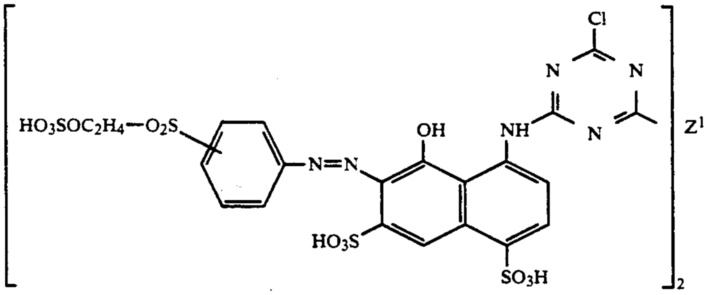

(Ic)

where $Z^1$ is as defined above.

Particular preference is further given to reactive dyes which conform to the formula Id (Id)

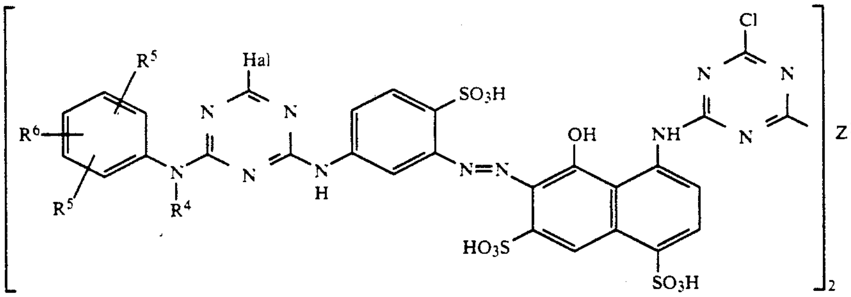

where

Hal is fluorine or chlorine, $R^4$ is hydrogen or $C_1$–$C_4$-alkyl, $R^5$ is hydrogen, $C_1$–$C_4$-alkyl or $C_1$–$C_4$-alkoxy, $R^6$ is hydrogen, $C_1$–$C_4$-alkyl or hydroxysulfonyl, and $Z^1$ is as defined above.

Of particular note are reactive dyes of the formula Ib where $R^4$ and $R^5$ are each hydrogen and $R^6$ is hydroxysulfonyl or where $R^4$ is hydrogen, $R^5$ is o,o'-$C_1$–$C_2$-alkyl and $R^6$ is methyl or hydrogen.

The novel reactive dyes of the formula I are prepared in a conventional manner.

For example, a) an amine of the formula II $$A—D—NH_2 \qquad (II)$$

where A and D are each as defined above, can be diazotized and coupled with a coupling component of the formula III (III)

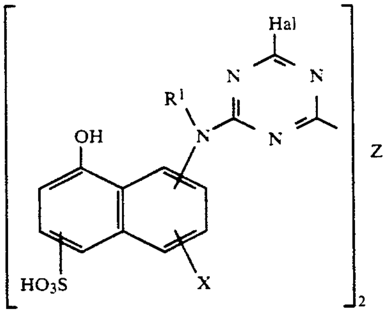

where $R^1$, X, Z and Hal are each as defined above.

A further method comprises for example diazotizing b) an amine of the formula II and coupling it with a coupling component of the formula IV (IV)

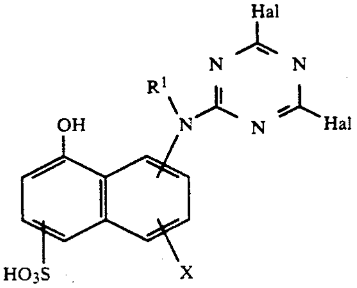

where $R^1$, X and Hal are each as defined above, and reacting the product with a compound of the formula V $$ZH_2 \qquad (V)$$

where Z is as defined above.

A further method comprises for example diazotizing c) an amine of the formula VI (VI)

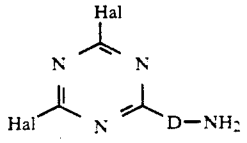

where Hal and D are each as defined above, coupling it with a coupling component III and optionally reacting the product with an aniline derivative of the formula VII (VII)

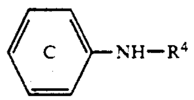

where $R^4$ and the ring C are each as defined above.

The novel reactive dyes of the formula I are advantageously suitable for dyeing or printing hydroxyl- or nitrogen-containing organic substrates. Such substrates are for example leather and fiber material which predominantly contain natural or synthetic polyamides or natural or regenerated cellulose The novel dyes are preferably used for dyeing and printing textile material based on cotton. Used in this way, they are notable for high fixation efficiencies.

The following Examples will further illustrate the invention:

EXAMPLE 1 a) An ice-cold suspension of 2-methylamino-5-aminobenzenesulfonic acid was prepared by acidifying a solution of 63 g of the sodium salt in 1000 ml of ice-water (down to pH 2), and 111 g of cyanuric chloride were added. 77 g of sodium bicarbonate were sprinkled in to adjust the pH to 5, and the suspension was subsequently stirred at 0°–5° C. for 3 hours until acylation of the amino groups was complete. The suspension of the bisacyl compound was then admixed with a solution of 191 g of 1-aminonaphth-8-ol-3,6-disulfonic acid in 400 ml of water and 35 ml of 50% strength by weight sodium hydroxide solution, brought to pH 5 and stirred at 40° C. for three hours. A small amount of suspended solids was then filtered off and the product of the formula

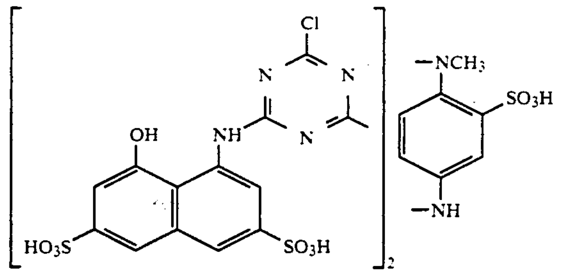

was precipitated with 600 g of sodium chloride. The precipitate was filtered off with suction, washed with 15% strength by weight sodium chloride solution and used in the form of a moist presscake for processing into the dyes described hereinafter. The crude yield was 91% of theory as tetrasodium salt.

Applied to cotton from an alkaline bath, it produces bluish red dyeings over a wide temperature range, starting from room temperature, with very high dyeing efficiency.

EXAMPLE 2 a) A solution of 0.38 mol of 1-aminonaphth-8-ol-3,6-disulfonic acid in 250 ml of water and 21 ml of 50% strength by weight sodium hydroxide solution was added to a thoroughly stirred suspension of 73.8 g (0.4 mol) of cyanuric chloride in 450 ml of ice-water and 5 ml of 30% strength by weight hydrochloric acid, and the mixture was subsequently stirred at 5°-8° C. for 2.5 hours until acylation of the aminonaphthalene was complete. This solution was then admixed with a solution of 34 g (0.18 mol) of 3,5-diaminobenzene-1-sulfonic acid in 200 ml of water and 10 ml of 50% strength by weight sodium hydroxide solution and adjusted to pH 5 with 20% strength by weight ice-cold sodium hydroxide solution. After stirring overnight at pH 5 and room temperature, the resulting product of the formula

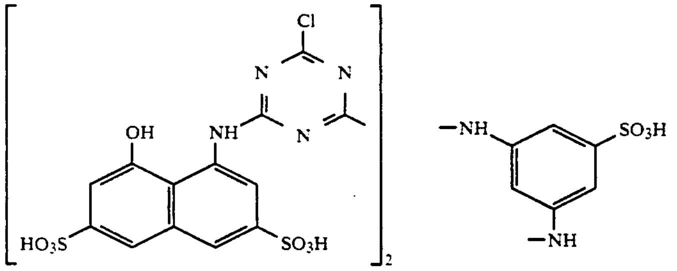

b) 14.1 g (0.05 mol) of 4-(2-sulfatoethylsulfonyl)aniline were dissolved with 10 ml of saturated sodium acetate solution in 150 ml of water at room temperature and cooled by stirring with 75 g of ice in an icebath. 15 ml of 3.33N aqueous sodium nitrite solution and 15 ml of 30% strength by weight hydrochloric acid were then simultaneously added dropwise, and the suspension was subsequently stirred at 0°-5° C. for about an hour. After excess nitrous acid had been destroyed with sulfamic acid, the suspension was admixed with a solution of 0.024 mol of the coupling component of a) in 200 ml of water. The coupling was carried out by the dropwise addition of 15 ml of saturated sodium acetate solution (down to pH 2) and two hours' stirring with warming to room temperature. The resulting dye of the formula

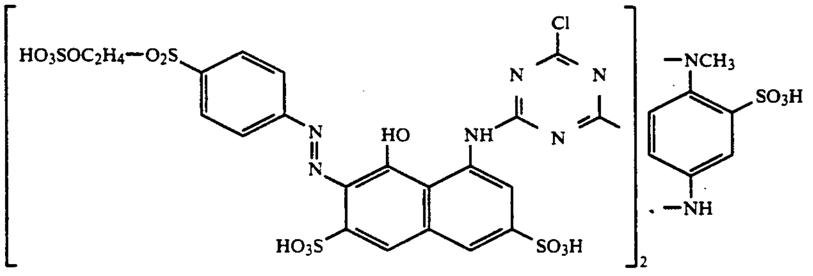

was precipitated with 150 g of potassium chloride, filtered off with suction, washed with acetone and dried at room temperature under reduced pressure was filtered off with suction as the sodium salt, washed with 5% strength by weight sodium chloride solution and used in the coupling reactions described hereinafter. The yield of crude product was 93% of theory.

b) 20.3 g (0.05 mol) of 2-(N-methyl-N-phenylamino)-4-chloro-6-(3'-amino-4'-hydroxysulfonylphenylamino)-s-triazine were dissolved with sodium bicarbonate in 250 ml of water (to pH 7) and admixed with 15 ml of 3.33 N aqueous sodium nitrite solution. The diazotization was carried out by slowly pouring this solution into 100 g of ice and 15 ml of 30% strength by weight hydrochloric acid. After stirring in the cold for one hour, excess nitrous acid was destroyed with sulfamic acid, and the jelly-like yellowish solution was added to a suspension of 0.024 mol of the binary coupling component a) in 250 ml of water, 100 g of ice and 15 g of sodium bicarbonate. The resulting dye of the formula

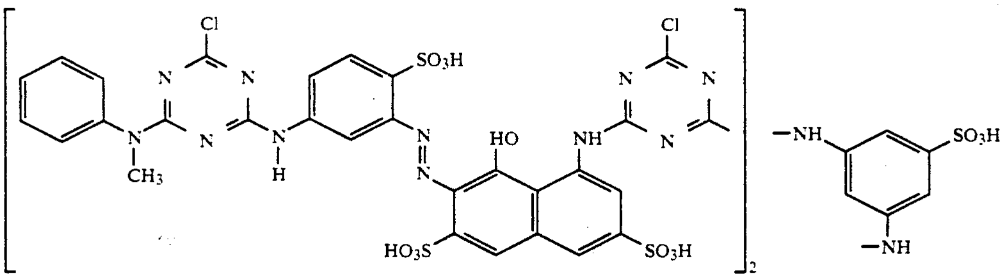

was precipitated from the solution with 100 g of sodium chloride, filtered off with suction, washed with 2.5% strength by weight sodium chloride solution and then with acetone and dried at room temperature under reduced pressure. Applied to cotton from an alkaline bath by the exhaust method at 80° C. it produces bluish red shades with a very high fixation efficiency.

The dyes listed in Table 1 below are obtained in a similar manner and likewise produce bluish to yellowish red shades with a very high dyeing efficiency.

TABLE 1

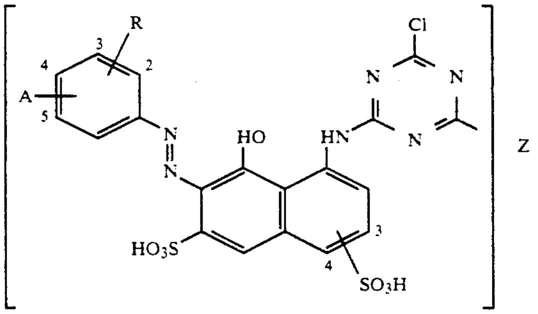

| Example No. | A | R | 3-/4-$SO_3H$ | Z | Hue on cotton |
|---|---|---|---|---|---|
| 3 | 5-$SO_2$—$C_2H_4$—$OSO_3H$ | H | 3 | 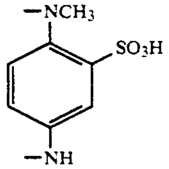 | red |
| 4 | 4-SO—$C_2H_4$—$OSO_3H$ | H | 3 | 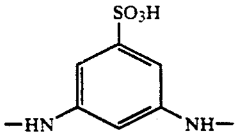 | bluish red |
| 5 | 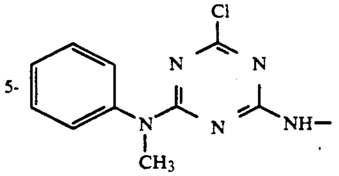 | 2-$SO_3H$ | 3 | 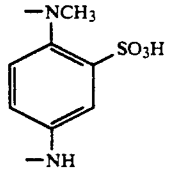 | bluish red |
| 6 | 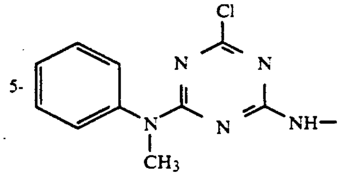 | $SO_3H$ | 3 | 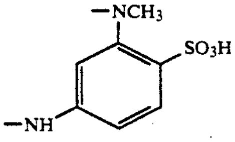 | red |

TABLE 1-continued
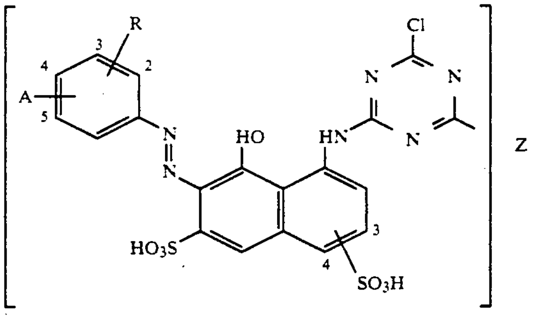
| Example No. | A | R | 3-/4-SO$_3$H | Z | Hue on cotton |
|---|---|---|---|---|---|
| 7 | 4-SO$_2$—C$_2$H$_4$—OSO$_3$H | H | 3 | 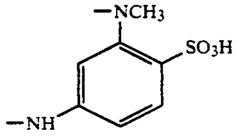 | red |
| 8 | 5-SO$_2$—C$_2$H$_4$—OSO$_3$H | H | 3 | 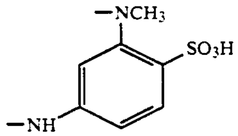 | red |
| 9 | 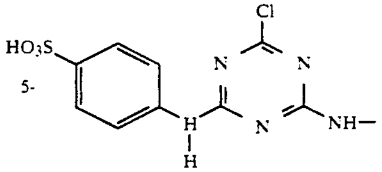 | 2-SO$_3$H | 3 | 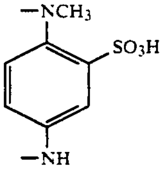 | bluish red |
| 10 | 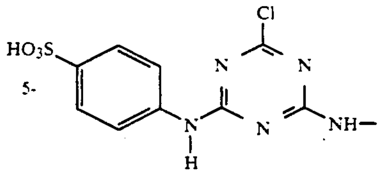 | 2-SO$_3$H | 3 | 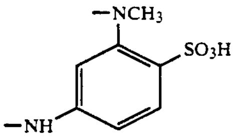 | red |
| 11 | 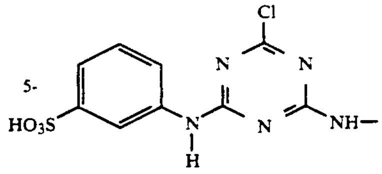 | 2-SO$_3$H | 3 | 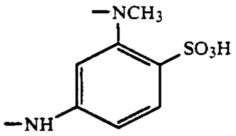 | red |
| 12 | 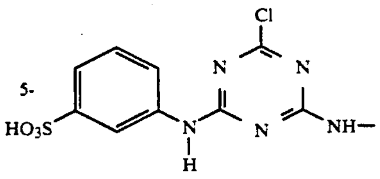 | 2-SO$_3$H | 3 | 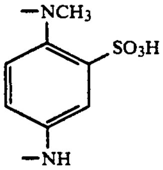 | bluish red |
| 13 | 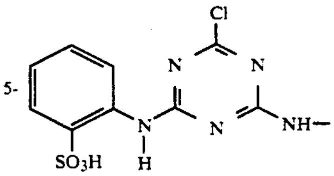 | 2-SO$_3$H | 3 | 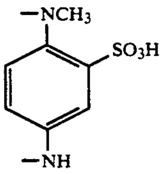 | bluish red |

TABLE 1-continued
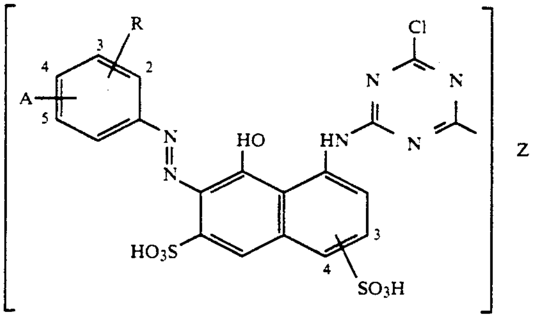
| Example No. | A | R | 3-/4-$SO_3H$ | Z | Hue on cotton |
|---|---|---|---|---|---|
| 14 | 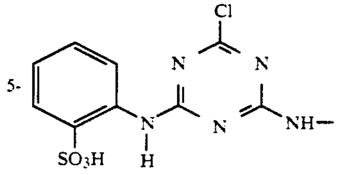 | 2-$SO_3H$ | 3 | 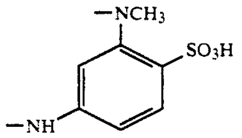 | red |
| 15 | 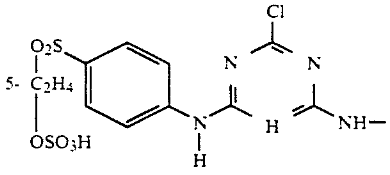 | 2-$SO_3H$ | 3 | 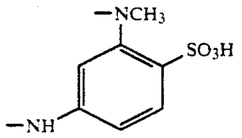 | red |
| 16 | 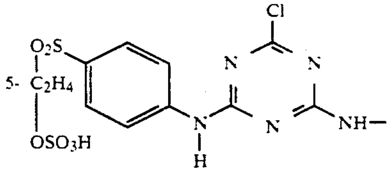 | 2-$SO_3H$ | 3 | 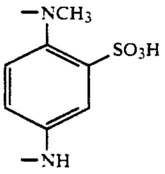 | bluish red |
| 17 | 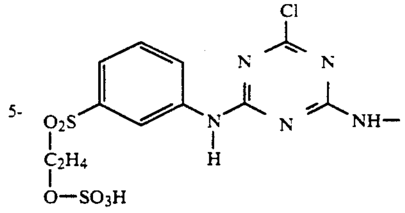 | 2-$SO_3H$ | 3 | 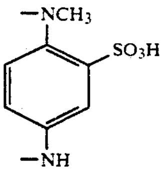 | bluish red |
| 18 | 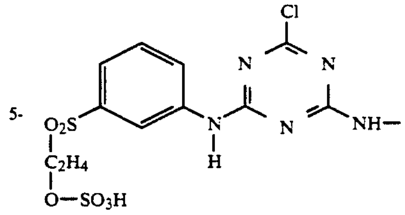 | 2-$SO_3H$ | 3 | 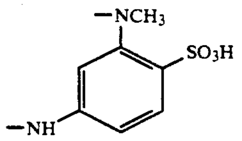 | red |
| 19 | 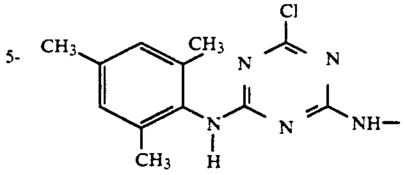 | 2-$SO_3H$ | 3 | 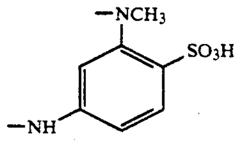 | red |

TABLE 1-continued
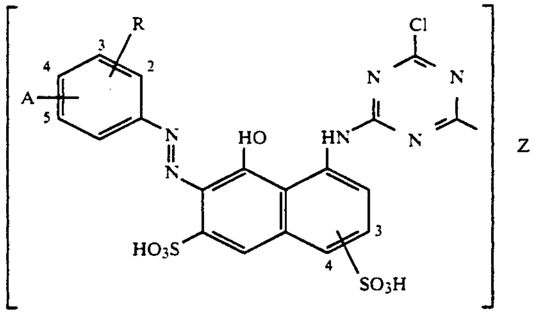
| Example No. | A | R | 3-/4-$SO_3H$ | Z | Hue on cotton |
|---|---|---|---|---|---|
| 20 | 5- 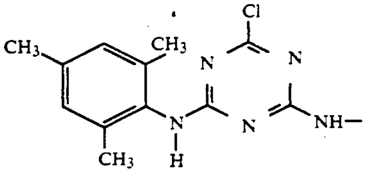 | 2-$SO_3H$ | 3 | 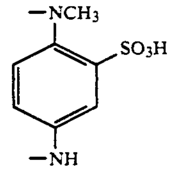 | bluish red |
| 21 | 5- 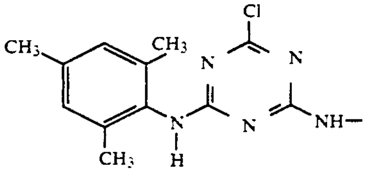 | 2-$SO_3H$ | 3 | 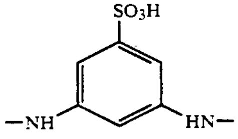 | red |
| 22 | 5- 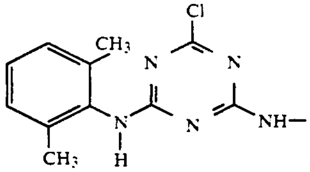 | 2-$SO_3H$ | 3 | 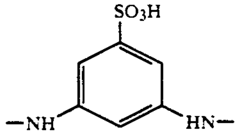 | red |
| 23 | 5- 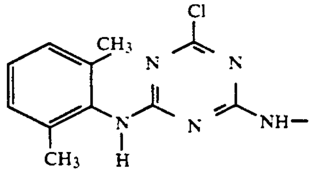 | 2-$SO_3H$ | 3 | 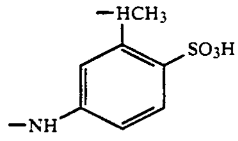 | red |
| 24 | 5- 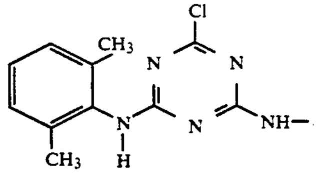 | 2-$SO_3H$ | 3 | 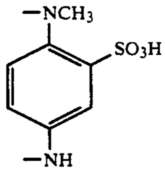 | bluish red |
| 25 | 5- 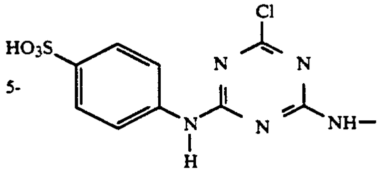 | 2-$SO_3H$ | 3 | 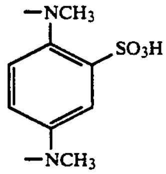 | bluish red |
| 26 | 5- 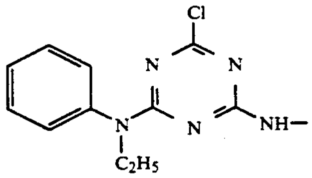 | 2-$SO_3H$ | 3 | 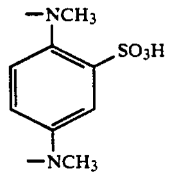 | bluish red |

TABLE 1-continued
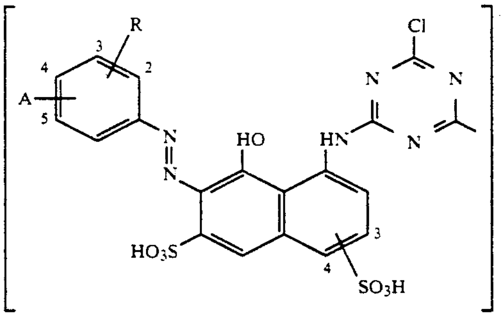
| Example No. | A | R | 3-/4-$SO_3H$ | Z | Hue on cotton |
|---|---|---|---|---|---|
| 27 | 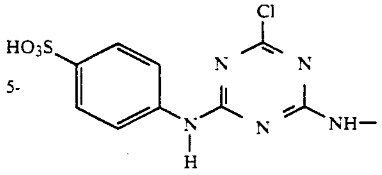 | 2-$SO_3H$ | 3 | 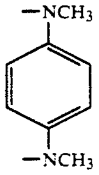 | bluish red |
| 28 | 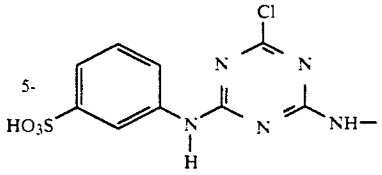 | 2-$SO_3H$ | 3 | 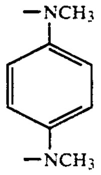 | bluish red |
| 29 | 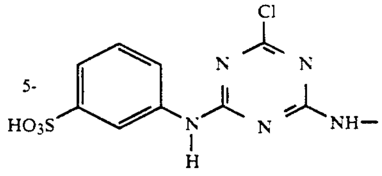 | 2-$SO_3H$ | 3 | 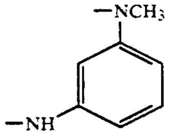 | red |
| 30 | 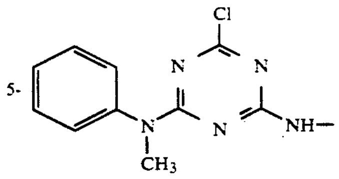 | 2-$SO_3H$ | 3 | 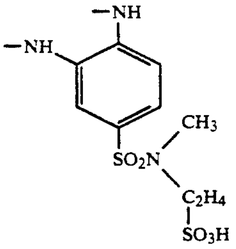 | red |
| 31 | 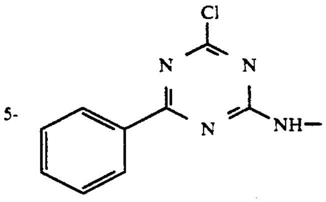 | 2-$SO_3H$ | 3 | 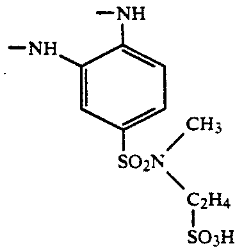 | red |

TABLE 1-continued
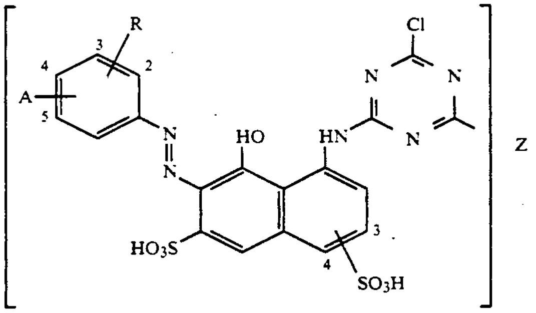
| Example No. | A | R | 3-/4-$SO_3H$ | Z | Hue on cotton |
|---|---|---|---|---|---|
| 32 | 5- 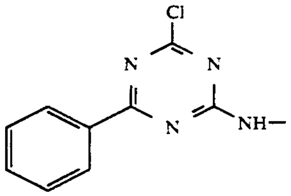 | 2-$SO_3H$ | 3 | 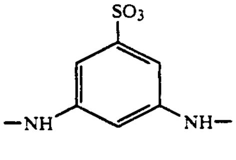 | red |
| 33 | 5- 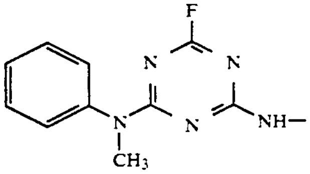 | 2-$SO_3H$ | 3 | 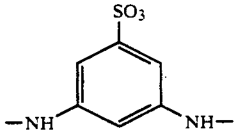 | red |
| 34 | 5- 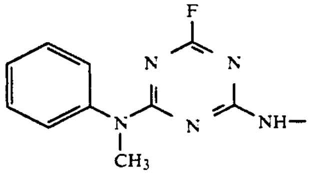 | 2-$SO_3H$ | 3 | 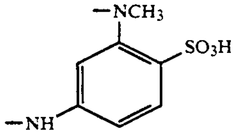 | red |
| 35 | 5- 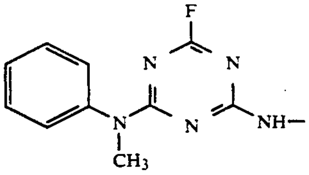 | 2-$SO_3H$ | 3 | 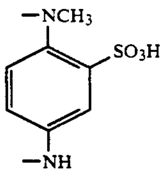 | bluish red |
| 36 | 5- 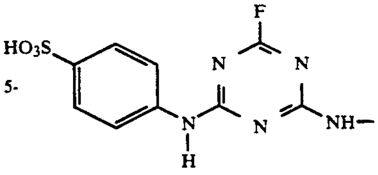 | 2-$SO_3H$ | 3 | 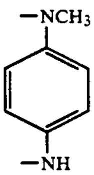 | bluish red |
| 37 | 5- 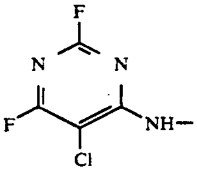 | 2-$SO_3H$ | 3 | 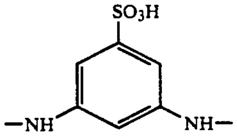 | red |

TABLE 1-continued
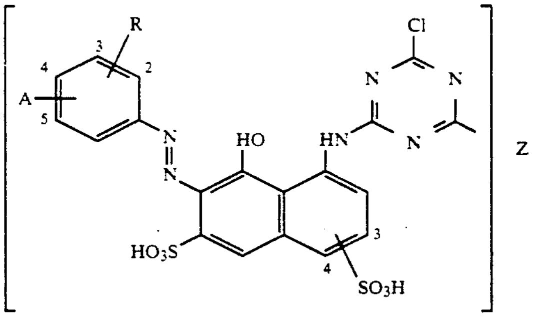
| Example No. | A | R | 3-/4-$SO_3H$ | Z | Hue on cotton |
|---|---|---|---|---|---|
| 38 | 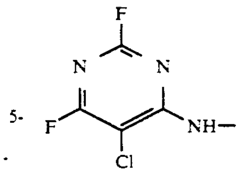 | 2-$SO_3H$ | 3 | 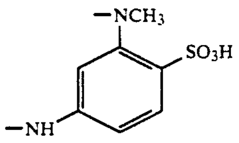 | red |
| 39 | 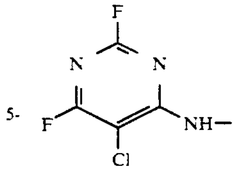 | 2-$SO_3H$ | 3 | 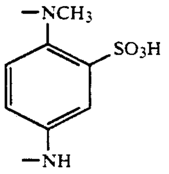 | bluish red |
| 40 | 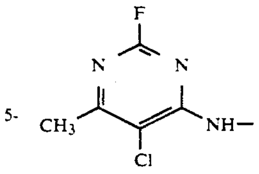 | 2-$SO_3H$ | 3 | 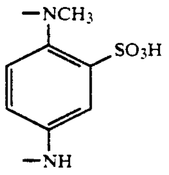 | bluish red |
| 41 | 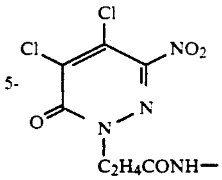 | 2-$SO_3H$ | 3 | 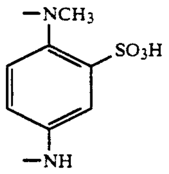 | bluish red |
| 42 | 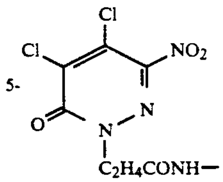 | 2-$SO_3H$ | 3 | 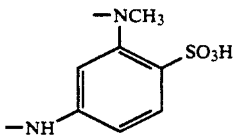 | red |
| 43 | 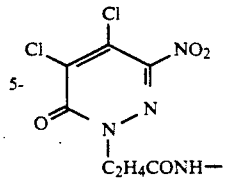 | 2-$SO_3H$ | 3 | 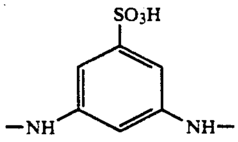 | red |

TABLE 1-continued
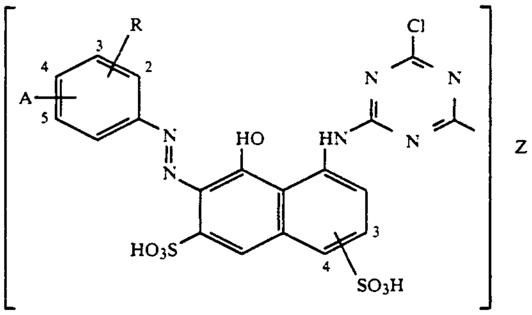
| Example No. | A | R | 3-/4-$SO_3H$ | Z | Hue on cotton |
|---|---|---|---|---|---|
| 44 | 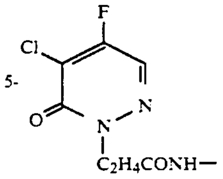 | 2-$SO_3H$ | 3 | 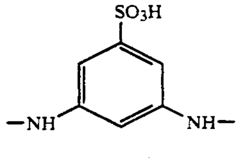 | red |
| 45 | 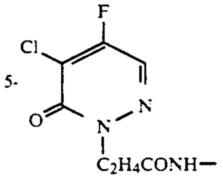 | 2-$SO_3H$ | 3 | 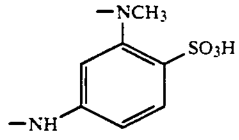 | red |
| 46 | 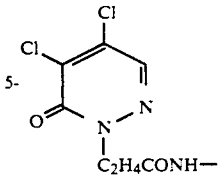 | 2-$SO_3H$ | 3 | 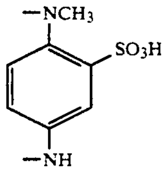 | bluish red |
| 47 | 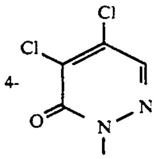 | 3-$SO_3H$ | 3 | 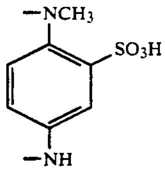 | bluish red |
| 48 | 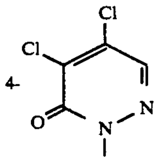 | 2-$SO_3H$ | 3 | 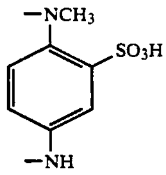 | bluish red |
| 49 | 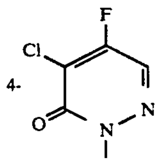 | 2-$SO_3H$ | 3 | 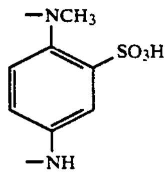 | bluish red |

TABLE 1-continued

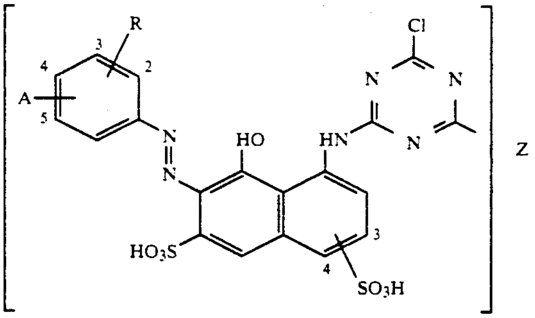

| Example No. | A | R | 3-/4-$SO_3H$ | Z | Hue on cotton |
|---|---|---|---|---|---|
| 50 | 5- 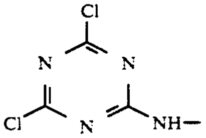 | 2-$SO_3H$ | 3 | 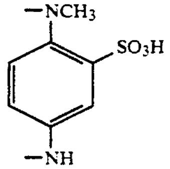 | bluish red |
| 51 | 5- 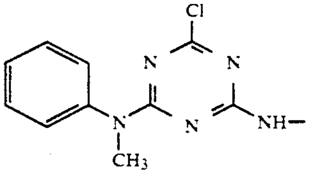 | 2-$SO_3H$ | 3 | $-NH-C_3H_6-NCH_3-$ | red |
| 52 | 4- 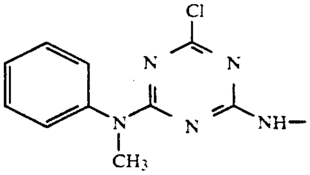 | H | 3 | 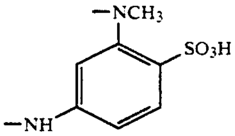 | violet |

EXAMPLE 53 a) 21.9 g (0.14 mol) of 1-amino-3-methylaminobenzene-4-sulfonic acid (in betaine form) were dissolved with 36 ml of 10% strength by weight sodium hydroxide solution in 100 ml of water at pH 7. This solution was added to a suspension of 51.7 g of cyanuric chloride in 250 ml of ice-water and 1 ml of 30% strength by weight hydrochloric acid, and the pH was adjusted to 5 with 30 g of sodium bicarbonate. After three hours, stirring at 0°-5° C. and pH 5, a sample was no longer couplable, and the diacylaminobenzenesulfonic acid was present in solution as the sodium salt. This solution was then admixed with a solution of 0.28 mol of 1-aminonaphth-8-ol-4,6-disulfonic acid in 200 ml of water and 17 ml of 50% strength by weight sodium hydroxide solution and adjusted to pH 4 with 16 g of sodium bicarbonate with warming to room temperature. After stirring under these conditions for 4 hours, the double condensation had ended. The reaction product was precipitated at pH 1 with 400 g of potassium chloride, filtered off with suction and washed acid-free with 27% strength by weight potassium chloride solution b) The method of Example 1b was repeated to couple 4-(2-sulfatoethylsulfonyl)aniline with the coupling component of Example 53a. The result was the dye of the formula

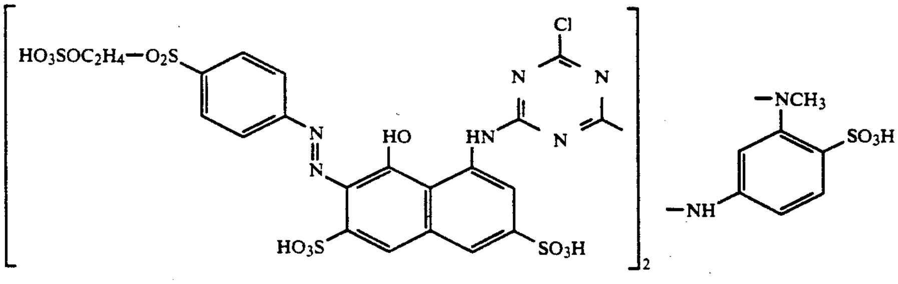

which dyes cotton from an alkaline bath in yellowish red shades with a high dyeing efficiency.

Similar characteristics are shown by the dyes of the formula
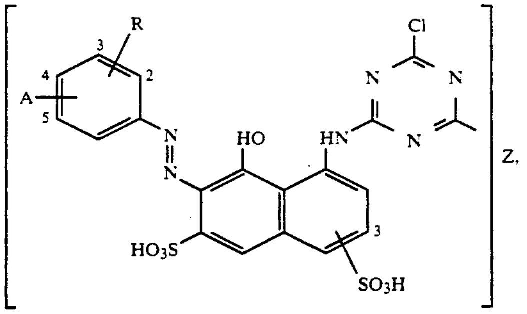
which are listed in Table 2 below and which are obtained as described in Examples 1, 2 and 53.
TABLE 2
| Example No. | | A | R | 3-/4-$SO_3H$ | Z | Hue on cotton |
|---|---|---|---|---|---|---|
| 54 | 5- | $SO_2C_2H_4—OSO_3H$ | H | 4 | 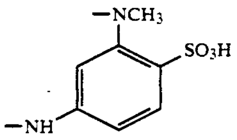 | yellowish red |
| 55 | 4- | $SO_2C_2H_4—OSO_3H$ | H | 4 | 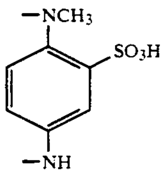 | yellowish red |
| 56 | 5- | $SO_2C_2H_4—OSO_3H$ | H | 4 | 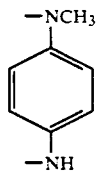 | yellowish red |
| 57 | 4- | $SO_2C_2H_4—OSO_3H$ | H | 4 | 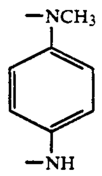 | yellowish red |
| 58 | 5- | 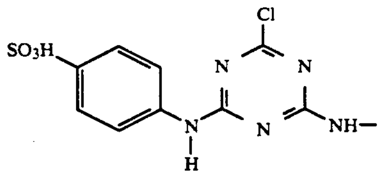 | 2-$SO_3H$ | 4 | 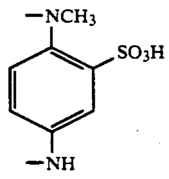 | yellowish red |
| 59 | 5- | 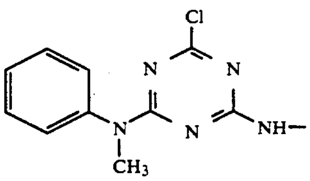 | 2-$SO_3H$ | 4 | 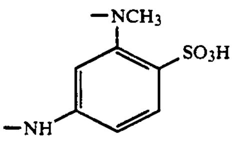 | yellowish red |

TABLE 2-continued

| Example No. | A | R | 3-/4-$SO_3H$ | Z | Hue on cotton |
|---|---|---|---|---|---|
| 60 | 4- 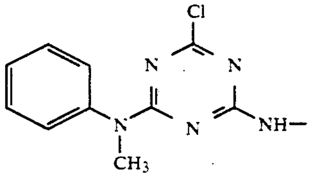 | 2-$SO_3H$ | 4 | 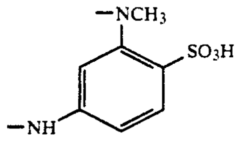 | yellowish red |
| 61 | 5- 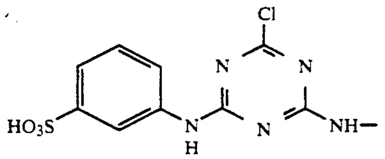 | 2-$SO_3H$ | 4 | 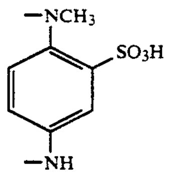 | yellowish red |
| 62 | 5- 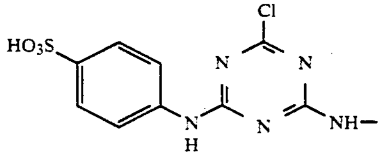 | 2-$SO_3H$ | 4 | 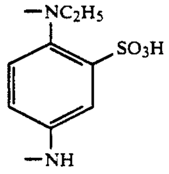 | yellowish red |
| 63 | 5- 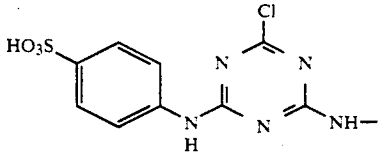 | 2-$SO_3H$ | 4 | 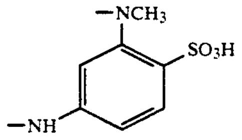 | yellowish red |
| 64 | 5- 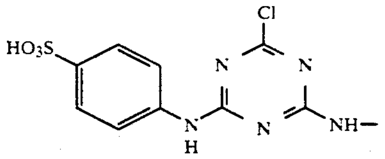 | 2-$SO_3H$ | 4 | 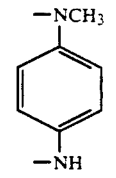 | yellowish red |
| 65 | 5- 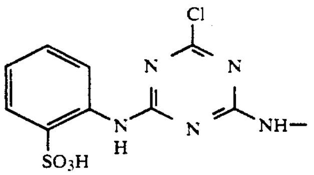 | 2-$SO_3H$ | 4 | 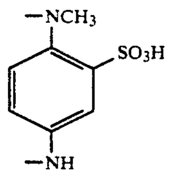 | yellowish red |

EXAMPLE 66

23.9 g of the sodium salt of 2-amino-5-hydroxynaphthalene-7-sulfonic acid were dissolved in 200 ml of water. This solution was added to a suspension of 18.4 g of cyanuric chloride in 150 ml of ice-water, and the mixture was adjusted to pH 3 with sodium bicarbonate. After stirring at 0°-5° C. for one hour, the mixture was filtered, and the filtrate was mixed with 10.1 g of the sodium salt of 1-methylamino-3-aminobenzene-6-sulfonic acid, dissolved in 100 ml of water. Sodium bicarbonate was then added to adjust the pH to 6, and the mixture was stirred at 45°-50° C. for 2 hours until the reaction had ended.

Coupling with 0.1 mol of a diazonium compound obtained as described in Example 1b gave the dye of the formula

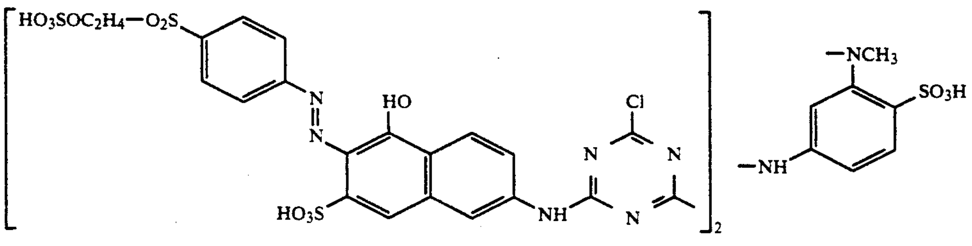

which applied to cotton from an alkaline bath at about 20°-80° C. produces orange shades with a high fixation efficiencies.

The methods of Examples 1, 2, 53 and 66 were also used to obtain the dyes of the formula

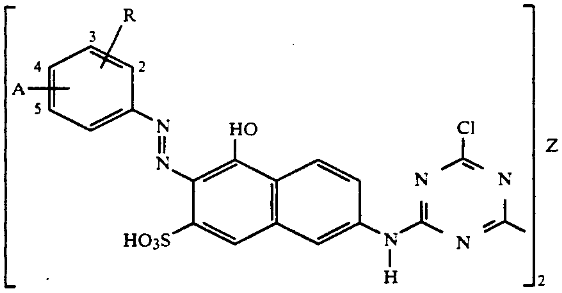

listed in Table 3 which are likewise notable for high fixation efficiencies.

TABLE 3

| Example No. | A | R | Z | Hue on cotton |
|---|---|---|---|---|
| 67 | 5- $SO_2-C_2H_4-OSO_3H$ | H | 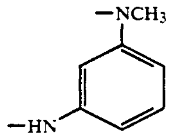 | orange |
| 68 | 4- $SO_2-C_2H_4-OSO_3H$ | H | 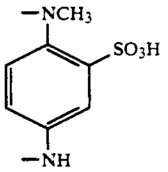 | orange |
| 69 | 5- $SO_2-C_2H_4-OSO_3H$ | H | 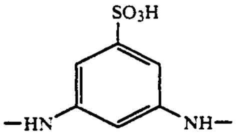 | orange |
| 70 | 5- 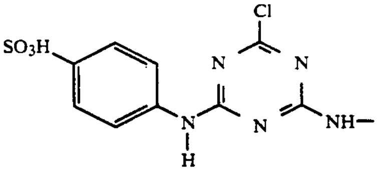 | 2-$SO_3H$ | 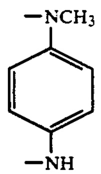 | orange |
| 71 | 5- 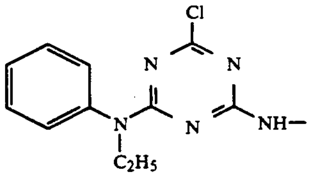 | 2-$SO_3H$ | 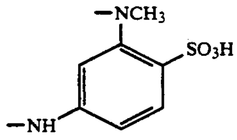 | orange |
| 72 | 5- 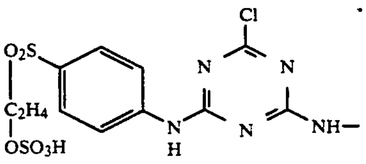 | 2-$SO_3H$ | 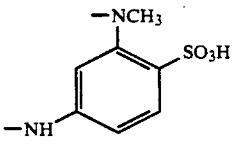 | orange |

TABLE 3-continued

| Example No. | | A | R | Z | Hue on cotton |
|---|---|---|---|---|---|
| 73 | 5- | 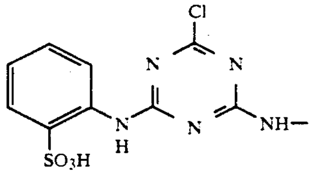 | 2-$SO_3H$ | 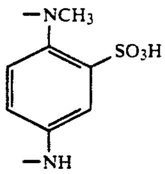 | orange |

We claim:

1. A reactive dye of the formula I

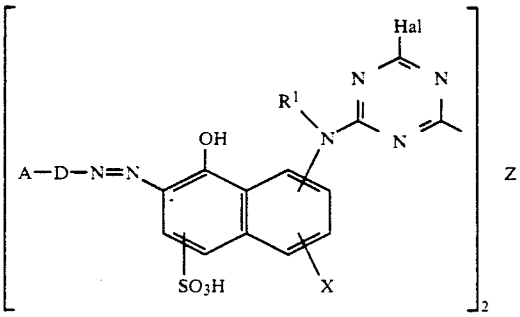

(I)

wherein $R^1$ is hydrogen, methyl or ethyl,

X is hydrogen or hydroxysulfonyl,

Hal is fluorine or chlorine,

A—D is a benzo-fused fiber-reactive group selected from the group consisting of

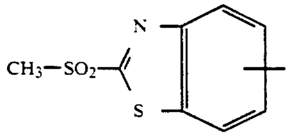

and

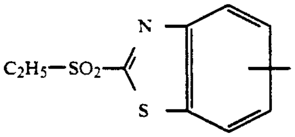

Z is a bridge member of the formula

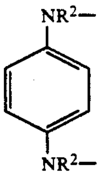
,
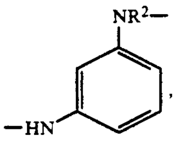
,
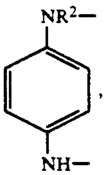
,
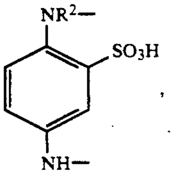
,
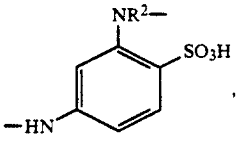
,

-continued

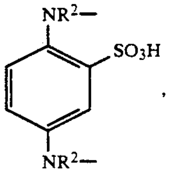
,
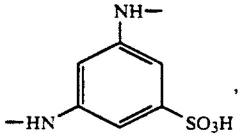
,
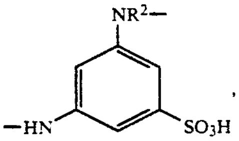
,
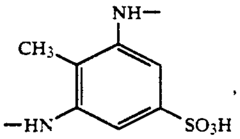
,
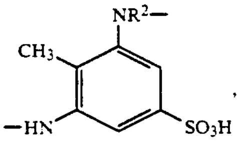
,
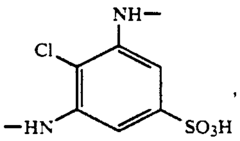
,
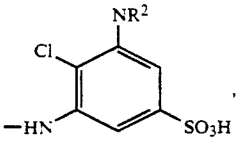
,
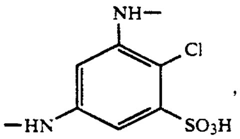
,
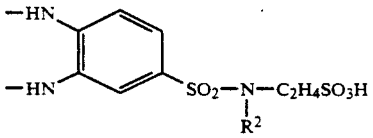

where $R^2$ is $C_1$-$C_4$-alkyl.

2. A reactive dye of the formula I

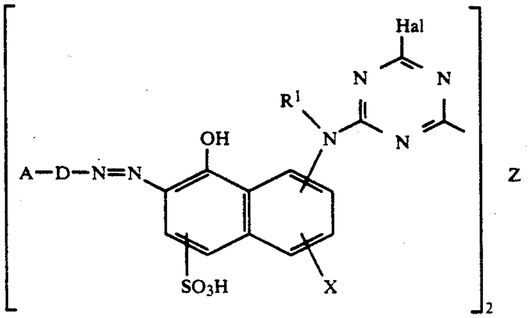

(I)

wherein said reactive dye has
(a) formula Ia
(Ia)
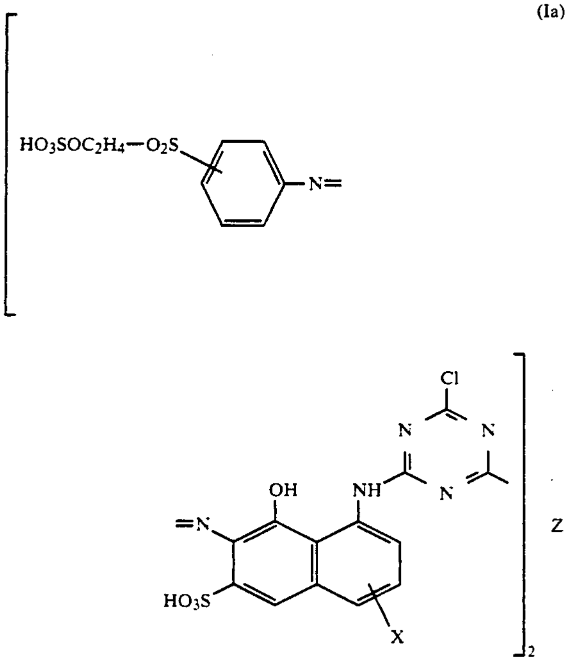
wherein X is hydrogen or hydroxysulfonyl,
(b) formula Ib
(Ib)
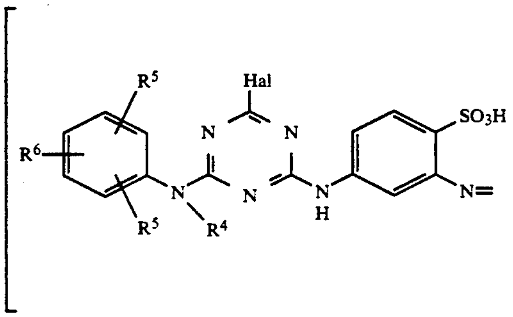
-continued
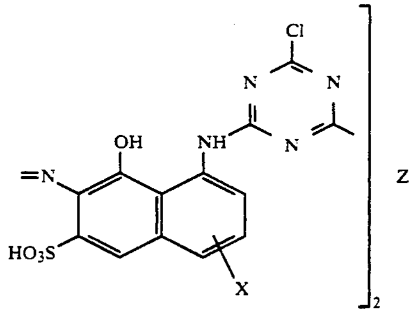
wherein Hal is chlorine; $R^4$ is hydrogen or $C_1$–$C_4$-alkyl; $R^5$ is hydrogen, $C_1$–$C_4$-alkyl or $C_1$–$C_4$-alkoxy; $R^6$ is hydrogen, $C_1$–$C_4$-alkyl or hydroxysulfonyl; and X is hydrogen or hydroxysulfonyl;
(c) formula Ic or
(Ic)
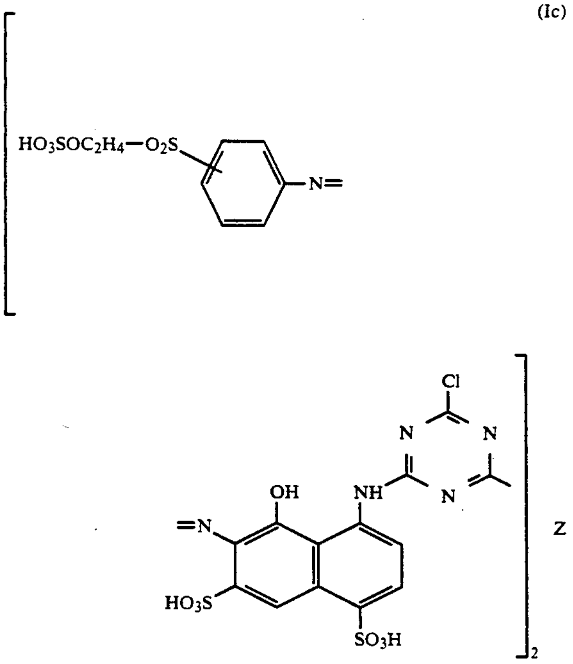
(d) formula Id (Id)

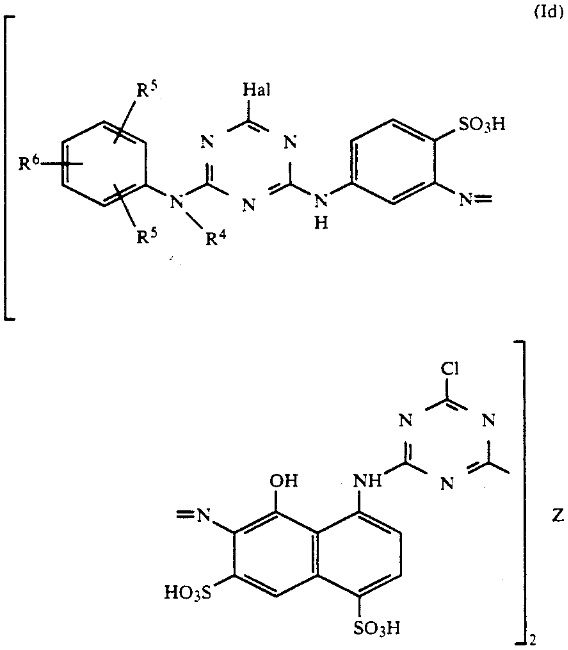

wherein Hal is chlorine; $R^4$ is hydrogen or $C_1$–$C_4$-alkyl; $R^5$ is hydrogen, $C_1$–$C_4$-alkyl or $C_1$–$C_4$-alkoxy; and $R^6$ is hydrogen, $C_1$–$C_4$-alkyl or hydroxysulfonyl; and Z is the group

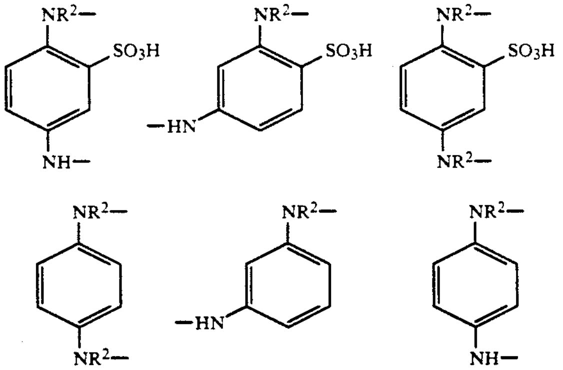

or

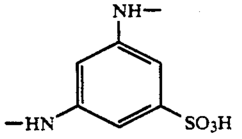

wherein $R^2$ is $C_1$–$C_4$-alkyl.

3. A reactive dye as claimed in claim 1, having Formula Ia (Ia)

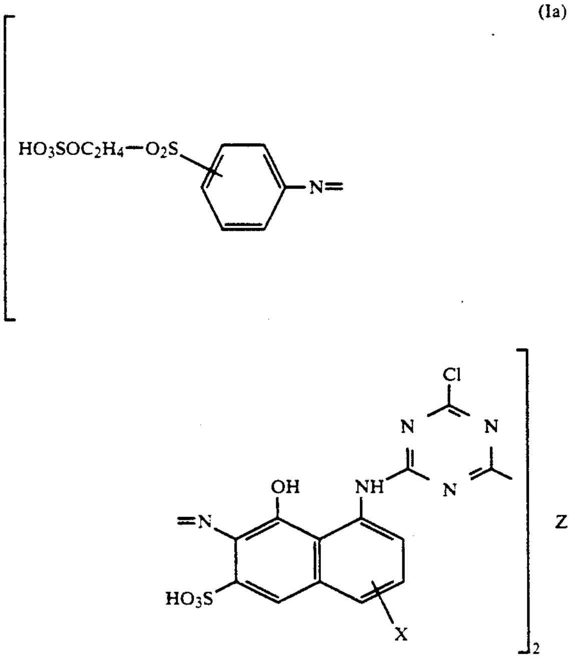

wherein X is hydrogen or hydroxysulfonyl.

4. A reactive dye as claimed in claim 1, having Formula Ib (Ib)

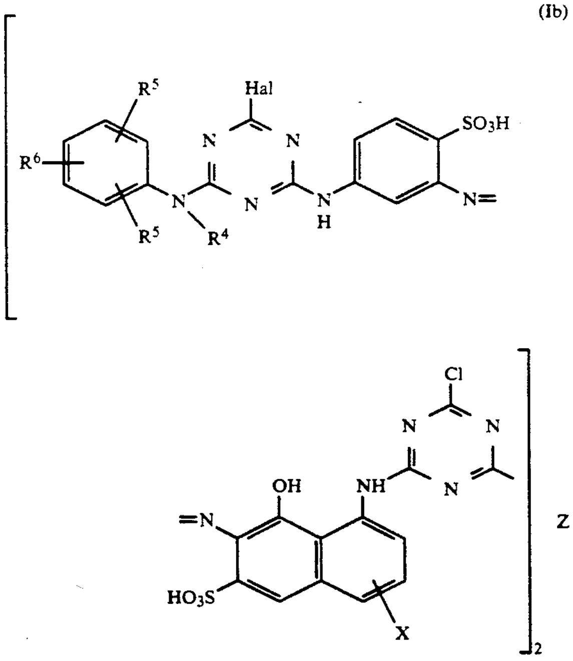

wherein Hal is chlorine; $R^4$ is hydrogen or $C_1$–$C_4$-alkyl; $R^5$ is hydrogen, $C_1$–$C_4$-alkyl or $C_1$–$C_4$-alkoxy; $R^6$ is hydrogen, $C_1$–$C_4$-alkyl or hydroxysulfonyl, and X is hydrogen or hydroxysulfonyl.

5. A reactive dye as claimed in claim 1, having Formula Ic (Ic)
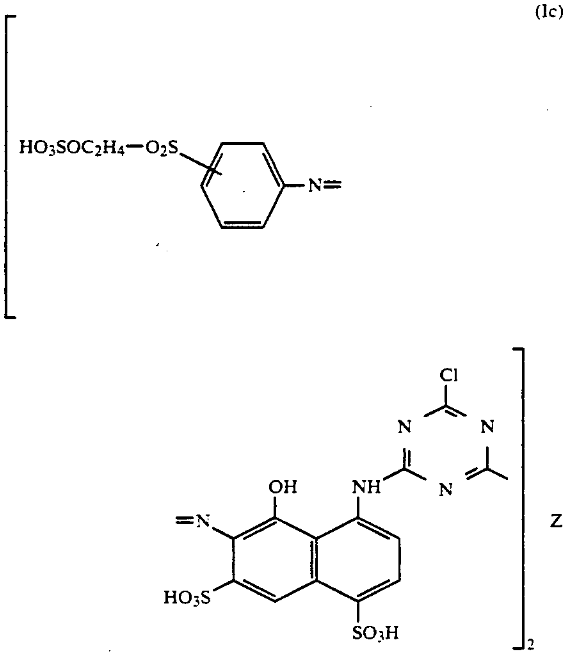
6. A reactive dye as claimed in claim 1, having Formula Id
(Id)
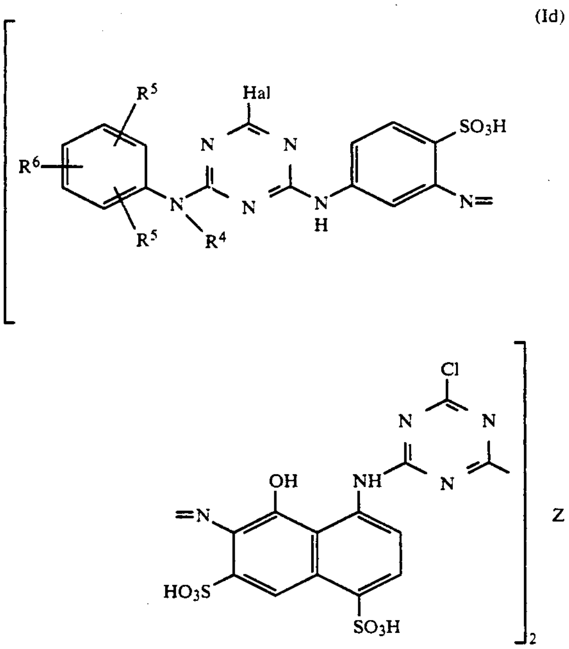
wherein Hal is chlorine; $R^4$ is hydrogen or $C_1$–$C_4$-alkyl; $R^5$ is hydrogen, $C_1$–$C_4$-alkyl or $C_1$–$C_4$-alkoxy; and $R^6$ is hydrogen, $C_1$–$C_4$-alkyl or hydroxysulfonyl.
* * * * *